United States Patent [19]
Brooks

[11] 3,827,534
[45] Aug. 6, 1974

[54] DISC BRAKE PARKING BRAKE

[75] Inventor: Frank W. Brooks, Dayton, Ohio

[73] Assignee: General Motors Corporation, Detroit, Mich.

[22] Filed: July 25, 1973

[21] Appl. No.: 382,442

[52] U.S. Cl. .............. 188/68, 188/106 F, 188/71.1
[51] Int. Cl............................................. F16d 63/00
[58] Field of Search........ 188/60, 69, 68, 31, 106 F, 188/71.1, 72.6

[56] References Cited
UNITED STATES PATENTS

| | | | |
|---|---|---|---|
| 3,244,260 | 4/1966 | Frayer | 188/106 F |
| 3,337,008 | 8/1967 | Trachte | 188/106 F |
| 3,356,193 | 12/1967 | Stowers | 188/106 F |
| 3,703,941 | 11/1972 | Okie et al. | 188/31 |

FOREIGN PATENTS OR APPLICATIONS

| 699,701 | 11/1953 | Great Britain | 188/69 |
|---|---|---|---|

Primary Examiner—George E. A. Halvosa
Assistant Examiner—Edward R. Kazenske
Attorney, Agent, or Firm—D. D. McGraw

[57] ABSTRACT

A disc brake has a peripherally mounted and driven annular disc and a fixed caliper assembly with a caliper leg on either side of the disc and a caliper mounting section extending across the disc radially inward thereof. The inboard caliper leg has a hydraulically actuated piston and cylinder for service brake actuation. The outboard caliper leg has a radially movable parking bolt which is selectively engageable with a mating slot, several circumferentially spaced slots for this purpose being provided in the disc drive and retainer member. The caliper mounting section has a cam rotatably received therein and engaging the parking bolt. The cam is actuated through a rotatable shaft and lever connected to a suitable parking brake control mechanism. The parking bolt is urged into engagement with a mating slot by a compression spring. The cam is rotated in one direction to permit the parking bolt to so engage the slot, and is rotatable in the other direction to disengage the bolt.

4 Claims, 3 Drawing Figures

DISC BRAKE PARKING BRAKE

The invention relates to a positive engagement type of disc brake parking brake mechanism in which a parking bolt engages a disc drive member under control of a parking brake actuating lever and shaft. This type of parking brake has positive locking action, is simple in operation, requires a relatively low effort of the vehicle operator to apply the brake, and may be actuated by manual or foot parking brake controls or by the transmission control lever. The parking brake bolt and the slot with which it mates may be formed with beveled sides so that the brake can permit wheel movement under severe stress without breaking or damaging the bolt. To accomplish this, the bolt will operate in a ratchet-like manner, re-engaging the next slot. A rotatable cam is provided to control the parking bolt, the cam being rotated by action of a torsion spring, one end of which is attached to an extension of the cam and the other end of which is grounded to the caliper. The rotation of the cam is controlled by a shaft which extends into the cam extension and receives the torsion spring about its body. The shaft is attached to an actuating lever, which is moved arcuately by suitable cables or other control elements under control of vehicle operator.

Figure 1:
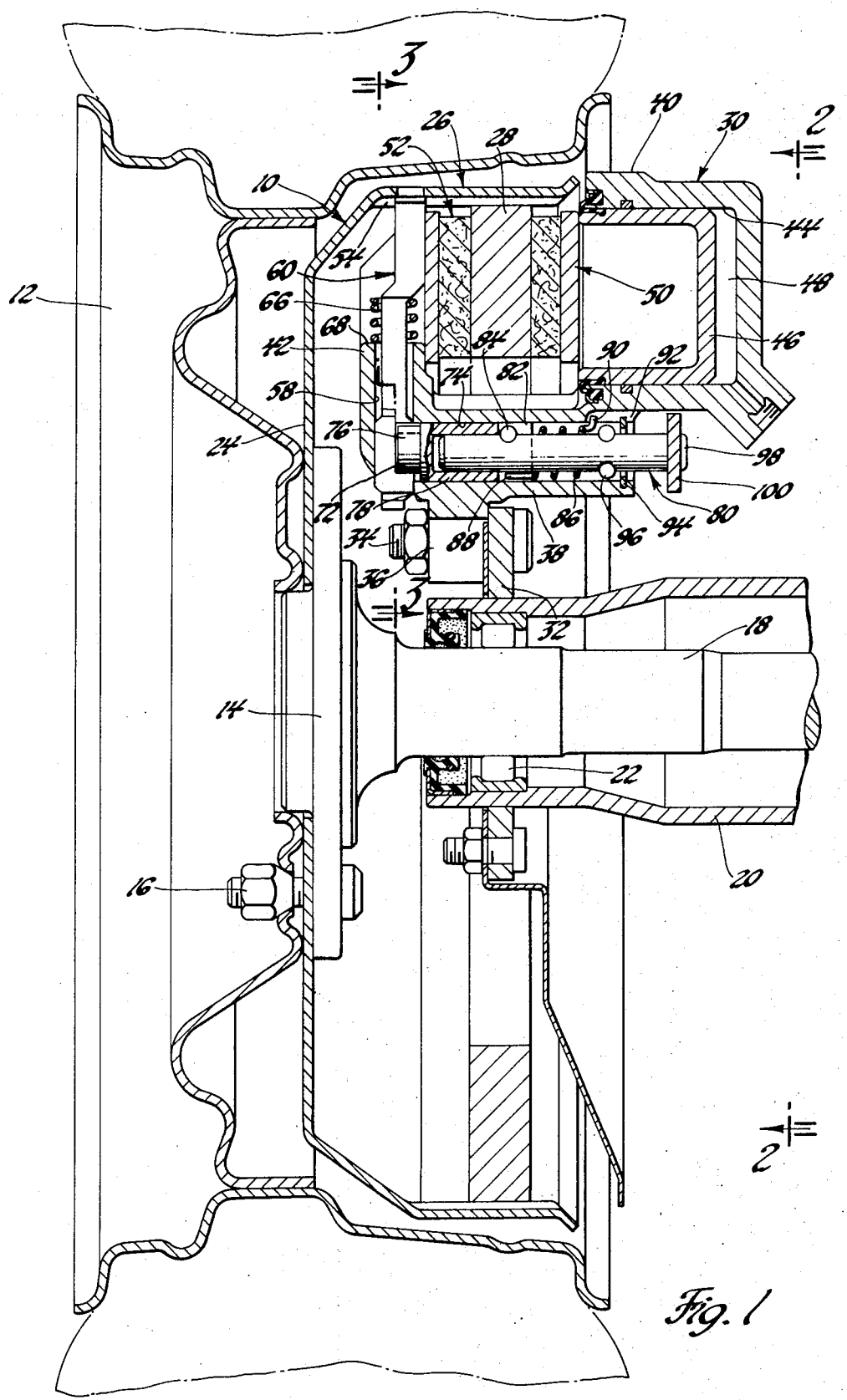
FIG. 1 is a cross-section view of a disc brake assembly, with parts broken away, and embodying the invention.
Figure 2:
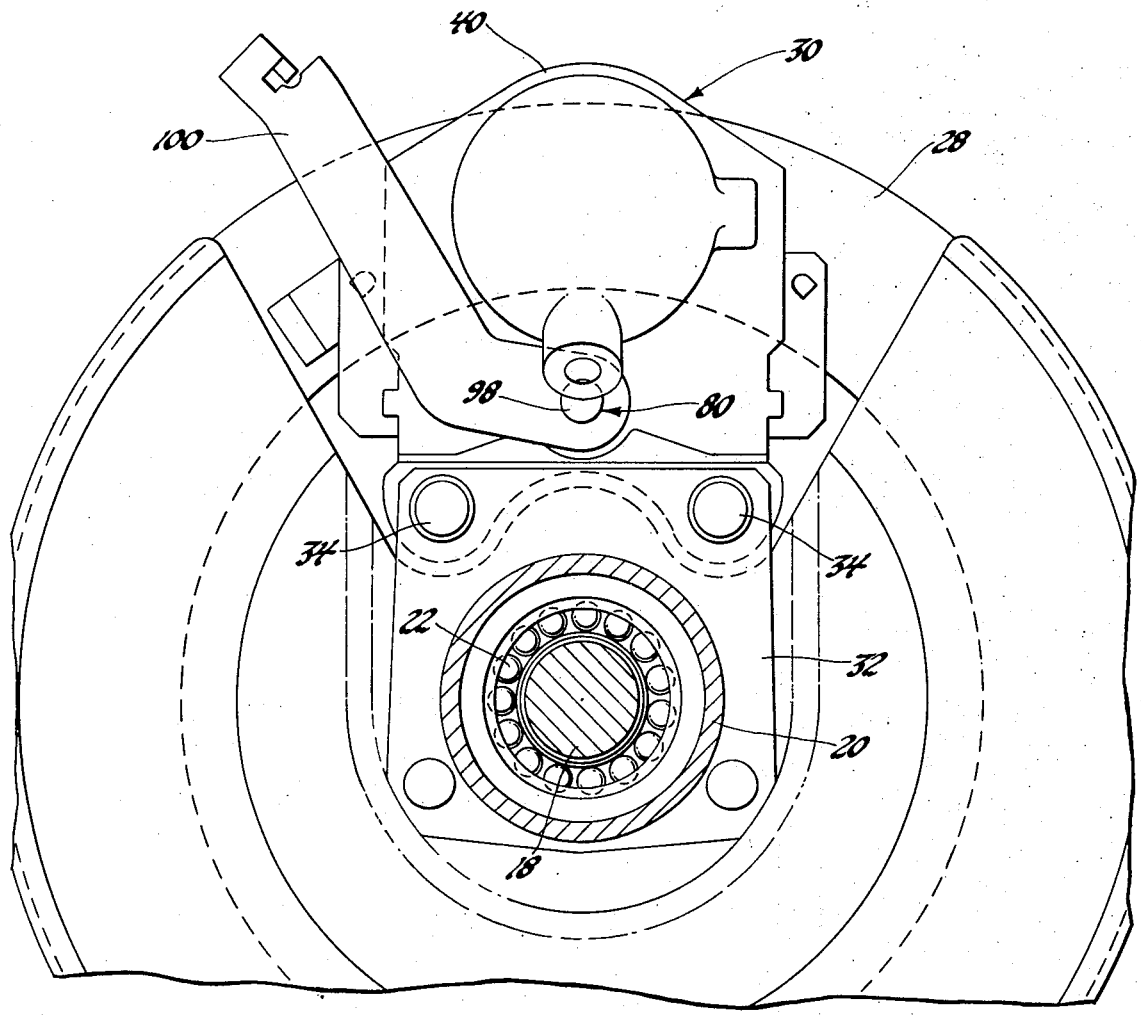
FIG. 2 is an elevation view taken in the direction of arrows 2—2 of FIG. 1, with parts broken away and in section.
Figure 3:
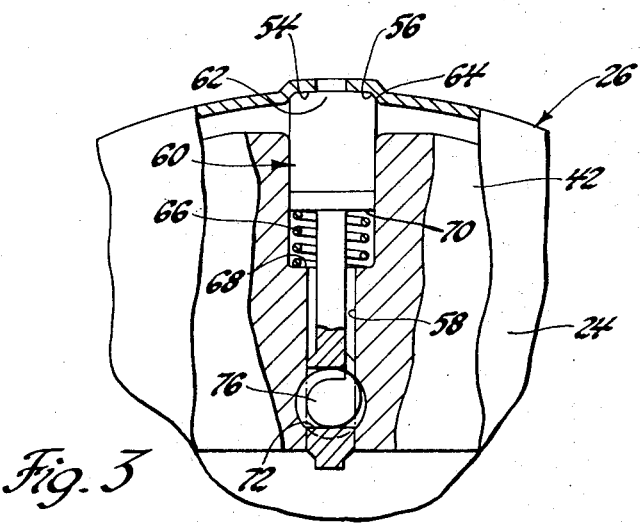
FIG. 3 is a fragmentary cross-section view of a portion of the brake of FIG. 1 taken in the direction of arrows 3—3 of that FIGURE.

The disc brake assembly 10 is illustrated as being installed with a vehicle rear wheel 12, the wheel being mounted on hub 14 by mounting bolts and nuts 16. The hub 14 is attached to the axle 18, which is rotatably mounted in axle housing 20 by means of bearing 22. The disc brake assembly includes a disc drive and retainer member 24, which is also mounted to hub 14 by the bolts and nuts 16.

Member 24 is generally dish-shaped, extending radially outwardly and then generally axially to provide a cylindrical disc mounting section 26. The disc 28 is annular and is peripherally mounted for axially sliding movement on member 24 by suitable lands and grooves formed on the disc outer periphery and as a part of the disc mounting section 26.

The disc brake assembly also includes a caliper assembly 30 which is fixed to the axle housing 20 by means of a mounting flange 32 and mounting bolts 34 which extend through lugs 36 formed as a part of the caliper mounting section 38. The caliper mounting section 38 extends across disc 28 radially inwardly thereof and joins the caliper inboard leg 40 and outboard leg 42. These legs extend on either side of the disc 28, the inboard leg 40 being constructed to provide a cylinder 44, which is a part of the service brake actuating mechanism. A piston 46 is reciprocably mounted in cylinder 44 to define therewith a pressure actuating chamber 48 into which hydraulic fluid pressure is introduced when the brakes are actuated. The inboard brake pad assembly 50 is positioned between piston 46 and disc 28 so that when the pressure of the fluid in chamber 48 moves the piston 46 toward disc 28 the friction lining of pad assembly 50 engages one side of disc 28 in friction braking relation. The outboard brake pad assembly 52 is mounted on the outboard caliper leg 42 so that disc 28 is moved axially by the actuated brake pad assembly 50 to engage the friction lining of brake pad assembly 52 with the other side of the disc 28 in friction braking relation.

A series of circumferentially spaced slots 54 are provided in the disc mounting section 26 of member 24. These slots may be separately formed from the drive grooves receiving the drive lands of disc 28 or may be the same grooves extended beyond the normal operational position of the disc and radially outward of the outboard caliper leg 42. As is better shown in FIG. 1, slots 54 are preferably provided with beveled sides 56.

A passage 58 extends radially through the outboard caliper leg 42 and the parking bolt 60 is reciprocably mounted in this passage. The outer end 62 of bolt 60 is in alignment for engagement with one of the slots 54 when the parking brake is set. Bolt end 62 is also preferably provided with beveled edges 64 which are complementary to beveled sides 56 of slots 54. A compression spring 66 is positioned to be seated on a shoulder 68 formed in passage 58 and to act on a shoulder 70 of bolt 60 to urge the bolt radially outward toward the disc mounting section 26 of member 24 so that the bolt can engage one or the slots 54 to lock the mechanism for parking purposes. If the bolt should not be aligned with one of the slots 54, slight movement of the vehicle will cause member 24 to move sufficiently so that a slot becomes aligned. Spring 66 will then cause the bolt to move into the slot.

The other end of bolt 60 has a slot or recess 72 formed therein to provide a cam following surface for the bolt. A passage 74 is formed through the caliper mounting section 38, is axially parallel to the axis of rotation of disc 28, and intersects passage 58. A cam 76 is received in one end of passage 74 and extends into recess 72 of bolt 60. The cam has a cylindrical extension 78 which extends away from bolt 60 toward the inboard side of the disc assembly. A shaft 80 extends from the inboard side of passage 74 so as to have one end piloted within the cam extension 78. The open end of the cam extension 78 has a slot 82 formed therethrough and a swaged nib 84 on shaft 80 engages slot 82. A torsion spring 86 is received about shaft 80 and has one end 88 extending into cam extension slot 82 and the other end 90 extending into a slot 92 formed in a portion of the caliper mounting section 38. A snap ring 94 in the inboard end of passage 74 provides a retainer for shaft 80, suitable means such as swaged nibs 96 being provided on the shaft to engage the stop. The end 98 of shaft 80 extending from passage 74 has an actuating lever 100 secured thereto so that the shaft may be rotated under control of the vehicle operator. Lever 100 is suitably positioned to be connected by cables to an operator-actuated mechanism.

In the preferred embodiment illustrated in the drawings, the parking brake mechanism is caused to engage through action of springs 66 and 86. The brake is applied by moving the force-holding lever 100 and permitting shaft 80 to rotate. The swaged nib 84 of shaft 80 permits the torsion spring 86 to rotate the cam 76 and permit the bolt 60 to move outwardly under the force exerted on it by spring 66. As described above, this permits the bolt end 62 to engage a slot 64. When the bolt moves outwardly to this extent, the cam 76 will rotate so as to lock the bolt in position. The brake is released by pulling lever 100 to rotate shaft 80 in the other direction and therefore to rotate cam 76 by means of nib 84 and cam extension 74. The cam then engages the lower side of recess 72, as seen in FIG. 1, and forces the bolt radially inward to disengage the bolt from slot 54.

It is claimed:

1. A disc brake parking brake comprising:
    an annular brake disc,
    a disc drive and retainer having means engaging the outer periphery of said disc in driving and sliding relation and bolt engaging means adjacent said disc,
    a brake caliper having a mounting section extending across said disc radially inwardly thereof and caliper legs extending on either side of said disc, brake pad assemblies on said legs for friction braking engagement with the opposed sides of said disc, and brake actuating means for said brake pad assemblies provided in one caliper leg for service brake actuation,
    parking brake actuating and release means having a pivotal shaft mounted in said caliper mounting section, a cam rotatably driven by pivotal movement of said shaft, and a parking bolt reciprocably mounted in one of said caliper legs in radially parallel relation to said disc and having one end engaging and following said cam and the other end selectively engaging said disc drive and retainer bolt engaging means to lock said disc drive and retainer against rotation when said cam is in one rotatable position and to release said disc drive and retainer when said cam is in another rotatable position.

2. The disc brake parking brake of claim 1, said bolt having compression spring means operatively acting thereon urging said bolt into engagement with said bolt engaging means and movement of said cam from said one rotatable position to said another rotatable position to release said disc drive and retainer loads said compression spring.

3. The disc brake parking brake of claim 1, said rotatable shaft having a torsion spring acting thereon loading said shaft and said cam toward said one rotatable position and control means connected to said shaft and controlling rotational movement thereof.

4. A disc brake having positive engagement parking mechanism and comprising:
    a rotatable disc and a rotatable disc drive and support member driving and supporting the disc and having a plurality of circumferentially spaced parking bolt-receiving recesses therein,
    a caliper having a body extending across said disc and on each side thereof and brake pad assemblies mounted on said caliper body and having means effecting friction braking engagement thereof with said disc,
    a parking bolt reciprocably received in a portion of said caliper body on one side of said disc and in alignment with the plane of rotation of said recesses for selective locking engagement with one of said recesses,
    means resiliently urging said bolt toward locking engagement with one of said recesses,
    and control means including a cam member rotatably received in the portion of said body extending across said disc and engaging said bolt in driving relation, a shaft for rotating said cam member to selectively hold said bolt away from said recesses and permit said bolt to engage one of said recesses under the urging of said resilient means, and manually operated means for rotating said shaft and located on the opposite side of said disc from said parking bolt.

* * * * *